United States Patent [19]

Eshelman

[11] 4,011,855
[45] Mar. 15, 1977

[54] SOLAR COLLECTOR

[76] Inventor: Frank R. Eshelman, 910 Fifth St., Ames, Iowa 50010

[22] Filed: May 31, 1974

[21] Appl. No.: 475,208

[52] U.S. Cl. .............................. 126/270; 126/271
[51] Int. Cl.² ............................................ F24J 3/02
[58] Field of Search ............................ 126/270, 271

[56] References Cited
UNITED STATES PATENTS

| 2,467,885 | 4/1949 | Freund | 126/271 |
| 2,594,232 | 4/1952 | Stockstill | 126/271 |
| 2,705,948 | 4/1955 | Rostock | 126/271 |
| 3,262,493 | 7/1966 | Hervey | 126/271 X |
| 3,310,102 | 3/1957 | Trombe | 126/270 X |
| 3,399,664 | 9/1968 | Suhay | 126/271 |
| 3,847,136 | 11/1974 | Salvail | 126/271 |
| 3,859,980 | 1/1975 | Crawford | 126/270 |
| 3,866,285 | 2/1975 | Clark | 126/271 X |

FOREIGN PATENTS OR APPLICATIONS

| 1,165,672 | 10/1958 | France | 126/270 |
| 235,563 | 2/1926 | United Kingdom | 126/270 |

Primary Examiner—John J. Camby
Assistant Examiner—Henry C. Yuen
Attorney, Agent, or Firm—Zarley, McKee, Thomte & Voorhees

[57] ABSTRACT

The solar collector of the present invention comprises a light collecting member mounted within a light reflecting member. The light reflecting member includes a surface having a curvature which causes all the light entering therein to be directed toward the light collecting member. In one modification of the device the reflecting member includes two circular surfaces, and in another modification the reflecting member includes a singular circular surface. The light collecting member may be a horizontal flat plate, an elongated member having a center and flanges radiating outwardly therefrom, an elongated circular member, or an elongated vertical plate.

9 Claims, 5 Drawing Figures

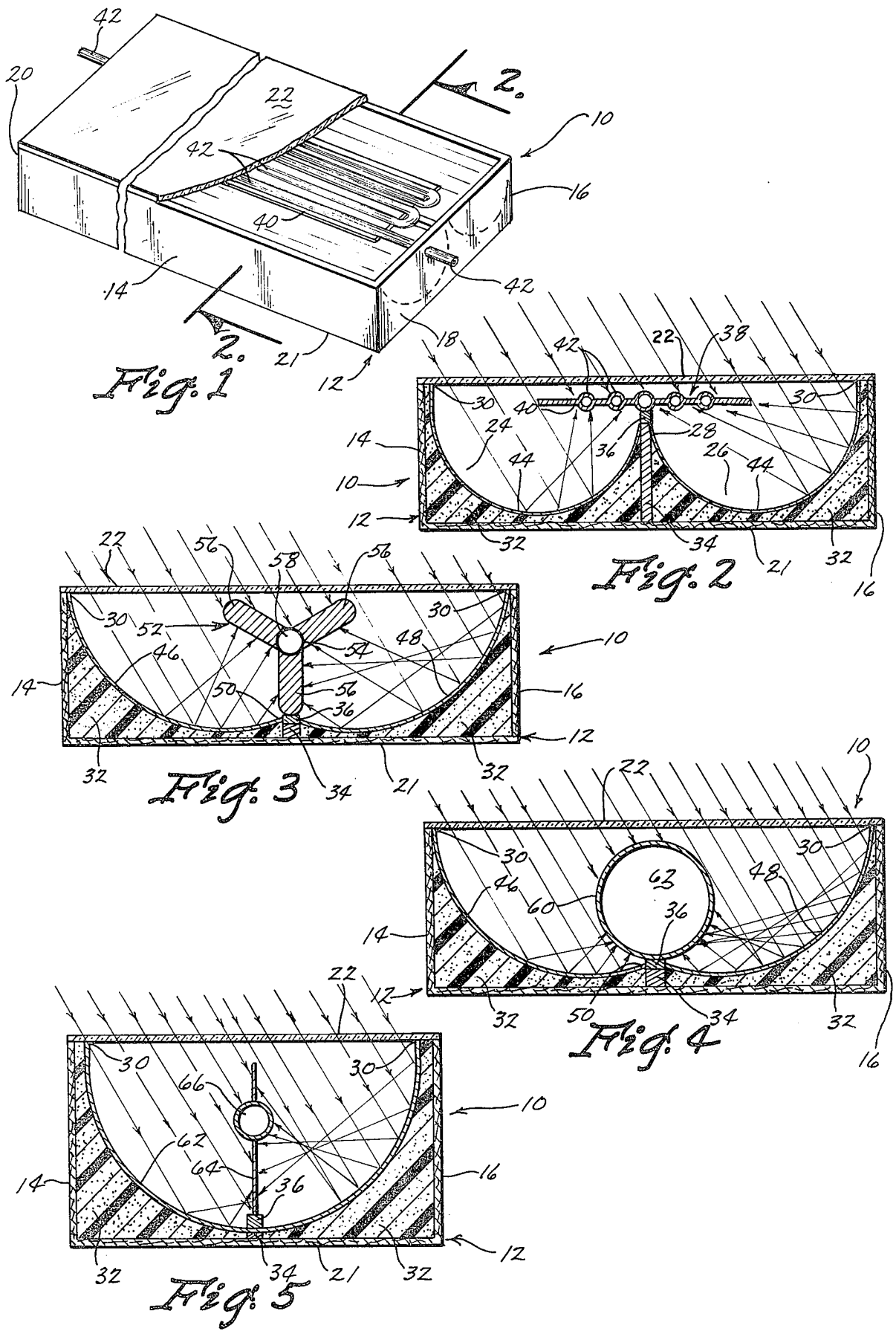

4,011,855

SOLAR COLLECTOR

SUMMARY OF THE INVENTION

This invention relates to solar collectors.

Solar collectors presently being used in solar energy systems fall within two general categories: Flat plate collectors and concentration collectors. The concentration collectors operate on the principal that the reflective element focuses the light to a central focal point so as to concentrate the heat at this focal point. The flat plate collectors tend to utilize flat surfaces which can receive light from a wide variety of angles, and which are exposed over a large cross sectional area. The concentration type of collector tends to be more efficient than the flat plate type of collector on sunny days, while the flat plate collectors tend to be more efficient on hazy days because they collect radiation from all angles. Concentration collectors also tend to work at a higher temperature and produce heat that can be used in more applications.

The collector of the present invention provides concentration of radiant energy while at the same time collecting radiant energy from all angles. Thus it is superior to both types of collectors previously mentioned, giving higher temperatures than flat plate collectors while at the same time collecting energy on both bright and overcast days. In addition, the collector of the present invention is designed to pick up solar rays from any angle and thus there is no need to provide power means to follow the movement of the sun.

Solar energy can be utilized for cooling as well as heating, and this is particularly true if it is possible to heat a fluid to a temperature exceeding 190 degrees Fahrenheit. The present invention makes posible the heating of water or other fluids such as ethylene glycol to a temperature in excess of 190 degrees Fahrenheit, and consequently, it makes possible the utilization of solar energy for air conditioning as well as for heating. This can be particularly advantageous inasmuch as air conditioning is most desirable on the hot sunny days, and a solar energized system would be most effecient on these hot days.

Therefore, a primary object of the present invention is the provision of the solar collector which concentrates radiant energy and which at the same time collects radiant energy from a wide variety of angles.

A further object of the present invention is the provision of a solar collector which is superior to flat plate collectors on sunny days and which is superior to concentration type reflectors on hazy days.

A further object of the present invention is the provision of a light collector which has a opening for receiving light and which includes means for directing all light entering through this opening into a radiant energy absorbing member regardless of the angle of entry through said opening.

A further object of the present invention is the provision of a device which utilizes solar energy to heat water or other fluids to a temperature in excess of 190° F.

A further object of the present invention is the provision of a device which traps radiant solar energy in an enclosed compartment so as to minimize heat loss from radiation.

A further object of the present invention is the provision of a device which is economical to manufacture, durable in use and attractive in appearance.

DESCRIPTION OF THE FIGURES OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the present invention.

FIG. 2 is the sectional view taken along line 2—2 of FIG. 1.

FIG. 3 is a sectional view similar to FIG. 2, but showing a modification of the present invention.

FIG. 4 is a sectional view similar to FIG. 2, and showing yet another modification of the present invention.

FIG. 5 is a sectional view similar to FIG. 2, and showing yet another modification of the present invention.

DETAILED DESCRIPTION

Referring to FIGS. 1 and 2, the solar collector of the present invention is referred to generally by the numeral 10. It includes an outer box frame 12 having lateral side walls 14 and 16, end walls 18 and 20, a bottom 21 and a transparent top 22. Top 22 may be any transparent material such as glass and the like, but the preferred material is a transparent form of the compound tetrafloropolyethylene which is manufactured under the registered trademark "Teflon." Top 22 may be hinged adjacent its edges to provide easy access into the interior of box frame 12.

Within box frame 12 are a pair of concave surfaces 24, 26 which are semicircular in shape and which intersect at an apex 28. Each concave surface 24, 26 forms a circular surface, and extends upwardly to transparent top 22. Apex 28 is substantially below top 22. Surfaces 24, 26 may be formed from any reflective material such as mirrors or the like. However, a preferred form for surfaces 24, 26 is polyester reflective film sold by Dupont Corporation under the trademark "Mylar," which has been coated with aluminum. It is referred to as aluminized Mylar and is readily available commercially. The upper lateral margins of surfaces 24, 26 are designated by the numeral 30. The curvature at margins 30 is such that all radiant energy passing through transparent top 32 adjacent margins 30 will be reflected in the general direction of apex 28. This is true regardless of the angle at which the light enters and strikes margins 30. Underlying surfaces 24, 26 is a foamed plastic material 32 which has the properties of being able to withstand high temperatures. A preferred foamed plastic material is a urea-formaldehyde foam. It is preferred because it can withstand temperatures up to 210° F. and is not flammable.

Extending upwardly from bottom 21 of box frame 12 is a vertical support member 34 made of wood or the like. Support member 34 extends upwardly to apex 28, and supports on its upper surface a pedestal member 36. Member 36 should be constructed of a material capable of withstanding high temperatures, and for this purpose it is preferred that a tetrafloropolyethylene manufactured under the trademark "Teflon" be utilized. Resting on pedestal member 36 and being supported thereby is a light absorbing member 38 which is comprised of a horizontal plate 40 having one or more continuous fluid passageways 42 extending therethrough. As shown in the drawings, passageway 42 is a singular passageway which is coiled back and forth along the length of plate 40 and which exits at the opposite end of box 12.

The width of plate 40 is substantially narrower than the distance between upper margins 30 of concave surfaces 24, 26. However, plate 40 is sufficiently wide to lie in covering relationship over the extreme lower portions 44 of arcuate surfaces 24, 26. Thus any light entering through top 22 with either strike plate 40, or will strike the portions of surfaces of 24, 26 which are located laterally outside lower portions 44. Thus, all light rays entering top 22 will either contact absorbing member 38 directly or will be reflected to absorbing member 38 by the arcuate surfaces 24, 26.

Absorbing member 38 may be formed of any light absorbing material, but it is preferred that an aluminum material be used with a thin coating of black nickel being electroplated thereon.

Referring to FIG. 3, a modified form of the present invention is shown. The device includes many components identical to those shown in FIG. 2, and these identical components are identified by the same numerals. The device of FIG. 3, however, includes a pair of arcuate reflective surfaces 46, 48 which intersect to form an apex 50 which is substantially lower than apex 28 of FIG. 2. Supported on pedestal member 36 is an elongated absorbing member 52 having a central portion 54 and three radially extending thin members 56. A single passageway 58 extends longitudinally through central portion 54.

Referring to FIG. 4, all the components shown therein are identical to those shown in FIG. 3 with the exception of the particular light absorbing member used. Accordingly, all corresponding members which are identical bear the same numerals as those shown in FIG. 3. An elongated cylindrical light absorbing member 60 is mounted on pedestal member 36 and has a diameter sufficiently large to place it in contact with all light rays which are reflected from surfaces 46, 48. Extending through absorbing member 60 is a passageway 62 for fluid.

Referring to FIG. 5, a device is shown utilizing a single circular reflective member 62 as opposed to the double curved surfaces shown in FIGS. 2 – 4. Mounted on pedestal member 36 is a vertically disposed plate 64 having an elongated conduit 66 extending longitudinally thereof. Plate 64 extends upwardly and is spaced a short distance below top 22.

All of the modifications described above have in common the feature that the collecting members 38, 52, 60, 64 are substantially smaller than the surface of exposure provided by top member 22. Thus the light is concentrated more than is the case with common plate type collectors. Furthermore, the reflective surfaces shown in the above modification all cause every light ray entering top 22 to be directed toward the reflecting member contained within the concave surfaces. This is true regardless of what angles the light strikes the reflective members.

All of the above modifications provide an advantage over previous concentration type solar collectors in that they collect light from all angles. Previous devices have traditionally been parabolic in shape, and would not collect light rays which strike the outer margins of the reflector at substantially horizontal angles. However, in the present invention, every light ray that enters through transparent top 22 comes in contact either directly or indirectly with the light collecting member therein. This is not true of conventional concentration type solar collectors.

While it is preferred that the concave surfaces such as 24 and 26 of FIG. 2 follow on at least partially circular path in cross section, with respect to the broadest aspect of the invention this is not essential. In the broadest sense the important factor is that all normals, that is lines perpendicular to a tangent to concave surfaces 24 and 36, must point towards, and if extended, intersect with, the light absorbing member 38 of FIG. 2. Thus, all reflected light will be directed towards absorbing member 38.

Additionally, an item of construction technique is worthy of mention. It has been found that the concave surfaces, coated with aluminized Mylar and backed with foamed plastic material 32 can be conveniently prepared as follows. A metal casting die having concave surfaces and having the desired dimensions for the foamed plastic material as used in the solar collector is prepared. The convex side of the curved surfaces is then covered with the aluminized Mylar material, with the reflective side in contact with the metal cast, and correspondingly away from the area to be filled with foamed plastic. Thereafter, the die is filled with the foamed plastic material, such as an urea-formaldehyde foam, by injection under pressure. After it sets the casting die is removed and the concave surfaces, backed with the foamed plastic material are ready for use.

The present invention also has advantages over the plate type collectors in that it does permit a substantial amount of concentration of solar energy so as to permit the heating of water to a very high temperature. It is believed that temperatures in excess of 190° F. can be obtained by use of the present invention, and with the ability to heat water to such temperatures it will be possible to use the water in presently known air conditioning systems as well as in heating systems. Thus it can be seen that the device accomplishes at least all of its stated objectives.

I claim:
1. A solar collector comprising:
  a light collecting member having an outer surface of light absorptive material adapted to retain a maximum amount of light which strikes said collecting member;
  said light collecting member having at least one fluid passageway therein;
  a light reflecting member having upper margins defining a light receiving opening, and having at least one concave surface extending between and below said upper margins, said concave surface comprising in cross section two curves following circular paths and intersecting at a point beneath and between said upper margins
  said light collector being substantially smaller than the width of said opening;
  said light reflector being positioned with respect to said light collector so that every light ray entering said opening is directed into engagement with said light collector
  said light collecting member extending over portions of both of said curves and being below said upper margins of said opening.
2. A solar collector according to claim 1 wherein said curves intersect at an upstanding apex, said collecting member resting on and being supported by said apex.

3. A solar collector according to claim 2 wherein said light collecting member is a flat plate member, said opening lying in a plane approximately parallel to said plate member.

4. A solar collector according to claim 1 wherein a transparent window member extends over said opening in covering relationship.

5. A solar collector according to claim 1 wherein said light reflective member is supported by a base frame which encloses a foamed plastic material, said plastic material being in supporting engagement with the undersurface of said reflective member.

6. A solar collector comprising:
a light collecting member which is a flat plate member having an outer surface of light absorptive material adapted to retain a maximum amount of light which strikes said collecting member;
said light collecting member having at least one fluid passageway therein;
a light reflecting member having upper margins defining a light receiving opening, which lies in a plane approximately parallel to said plate member and having at least two concave surfaces extending between and below said upper margins, all normals to said concave surfaces intersecting with said light collecting member;
said light reflecting member being supported by a base frame which encloses a foamed plastic material, said plastic material
being in supportive engagement with the under surface of said reflective member;
said light collector being substantially smaller than the width of said opening;
said light collecting member extending over portions of each of said surfaces and being below said upper margins of said opening so that every light ray entering said opening is directed into engagement with said light collector.

7. The solar collector of claim 6 wherein said concave surfaces are adjacent concave surfaces.

8. The solar collector of claim 7 wherein said concave surfaces follow circular paths intersecting at a point beneath and between said upper margins; said collecting member extending over portions of both of said curves and being positioned below said upper margins of said opening.

9. A solar collector comprising:
a light collecting member which is a flat plate member having an outer surface of light absorptive material adapted to retain a maximum amount of light which strikes said collecting member;
said collecting member having at least one fluid passageway therein;
a light reflecting member having upper margins defining a light receiving opening, which lies in a plane approximately parallel to said plate member and having at least two concave surfaces extending between and below said upper margins, said concave surfaces following a partial circular path in cross section;
said light collector being substantially smaller than the width of said opening;
said light reflecting member being supported by a base frame which encloses a foamed plastic material in supportive engagement with the underside of said reflective member;
said light collecting member extending over portions of each of said surfaces and being below said upper margins of said opening so that every light ray entering said opening is directed into engagement with said light collector.

* * * * *